UNITED STATES PATENT OFFICE.

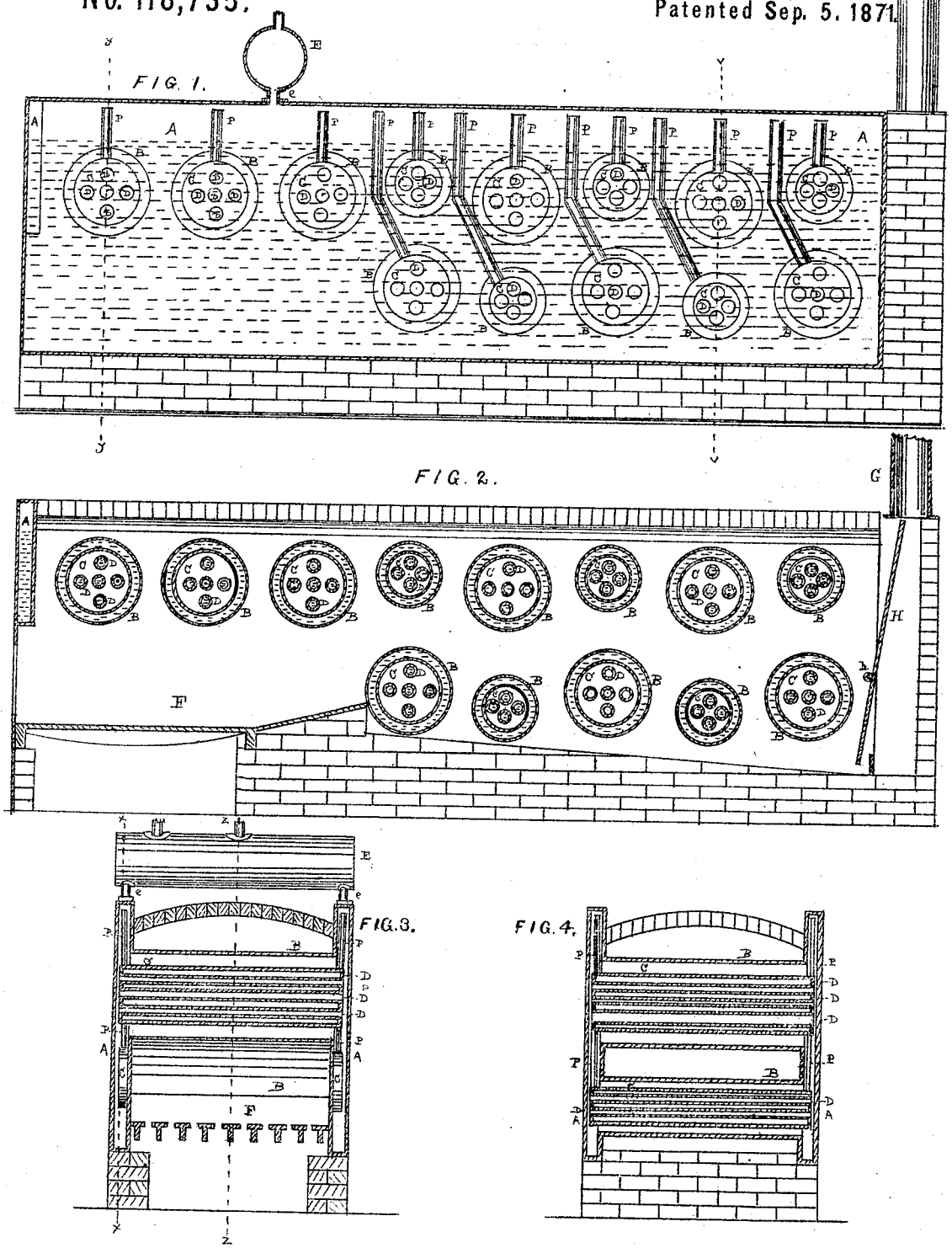

JOHN MANN, OF TUSCOLA, ILLINOIS.

IMPROVEMENT IN STEAM-GENERATORS.

Specification forming part of Letters Patent No. 118,735, dated September 5, 1871.

*To all whom it may concern:*

Be it known that I, JOHN MANN, of Tuscola, in the county of Douglas and State of Illinois, have invented certain Improvements in Steam-Generators, of which the following is a specification:

The first part of my invention relates to an improvement in steam-generators, so that a series of boilers or shells is connected together at each end by water-boxes, said shells being placed transversely to the line of draught, and so that they shall be exposed to the blaze and heat all around their circumference, the blaze at the top or bottom of the furnace being regulated with a damper at the rear of the same. The second part of my invention relates to an arrangement of a series of steam-reservoirs inside of the cylindrical shells or boilers, so that the steam therein shall serve to heat the water that is in the boilers. The third part of my invention relates to an arrangement of a series of pipes in the steam-reservoirs and parallel with them, so that water shall flow through them and be heated by the steam in the reservoir. The fourth part of my invention relates to a water-box forming the sides and front end of the furnace and surrounding the boilers, steam-reservoirs, and pipes, the whole so arranged that a current of water shall deposit all of the sediment at the bottom of the water-box.

Figure 1 is a side sectional elevation of a steam-generator taken through the dotted lines $x\ x$, Fig. 3. Fig. 2 is a side sectional elevation taken through the dotted lines $z\ z$, Fig. 3. Fig. 3 is transverse section taken through the dotted lines $y\ y$, Fig. 1. Fig. 4 is a transverse section taken through the dotted lines $v\ v$, Fig. 1.

A is the water-box, this water-box being on the sides and front end of the furnace. B B B is a series of boilers or shells fastened to the inner walls of the water-box. C C C is a series of steam-reservoirs placed within the boilers. $p\ p\ p$ are pipes leading to near the top of the water-box. D D D are pipes in the steam-reservoirs, these pipes being open at each end and fastened to the ends of the steam-reservoirs. E is a steam-drum placed upon the top of the furnace, and in which the steam passes from the top of the water-box, passing through the pipe $e$. The top of the furnace is arched over with brick, leaving a space between the top of the boilers or shells and the bottom of the arch for the passage of the blaze; by this means the blaze passes all around the shells. The shells are placed so that there is no direct draught between the back of the fire-box F and the chimney G, but the blaze strikes the sides of the shells and passes between the two shells and over them, so that their whole circumference shall be exposed to the blaze. The water-box is filled with water, as shown in the drawing. The ends of boilers B B B and the pipes D D D being open, the water passes through them. The steam as it is generated (when the steam-drum E is filled with steam) passes down through the pipes $p\ p\ p$ and serves to heat the water that is in the pipes D D D and the boilers B B B, generating steam with the steam that is in the reservoir. There being a constant flow of water through the shells B B B and the pipes D D D will cause the sediment to be kept in motion through them, and as the sediment reaches the water-box it will fall to the bottom of it. The amount of heat to the upper or lower series of boilers is regulated by the damper H, which is pivoted at $h$. Suitable water-gauges should be placed upon the front or side of the water-box and a safety-valve on the steam-drum. The water-box should be filled with water above the upper tier of shells.

I claim as my invention—

1. The combination of the water-box A, shells B B, steam-reservoir C C, pipes $p\ p$ and D D, substantially as and for the purpose hereinbefore set forth.

2. The arrangement of a series of steam-reservoirs inside of the cylindrical shells opening into the water-box, so that the reservoirs shall be surrounded with water, substantially as described, and for the purpose hereinbefore set forth.

3. The pipes D D D in the steam-reservoir B, so that the steam in the reservoir shall generate steam in the pipes, as and for the purpose hereinbefore set forth.

4. The damper H, in combination with a steam-generator, constructed substantially as described, and for the purpose hereinbefore set forth.

JOHN MANN.

Witnesses:
 BRICE I. STERRETT,
 ROBERT W. STERRETT.